W. H. MOORE.
DUMP WAGON.
APPLICATION FILED APR. 23, 1908.
914,157.
Patented Mar. 2, 1909.
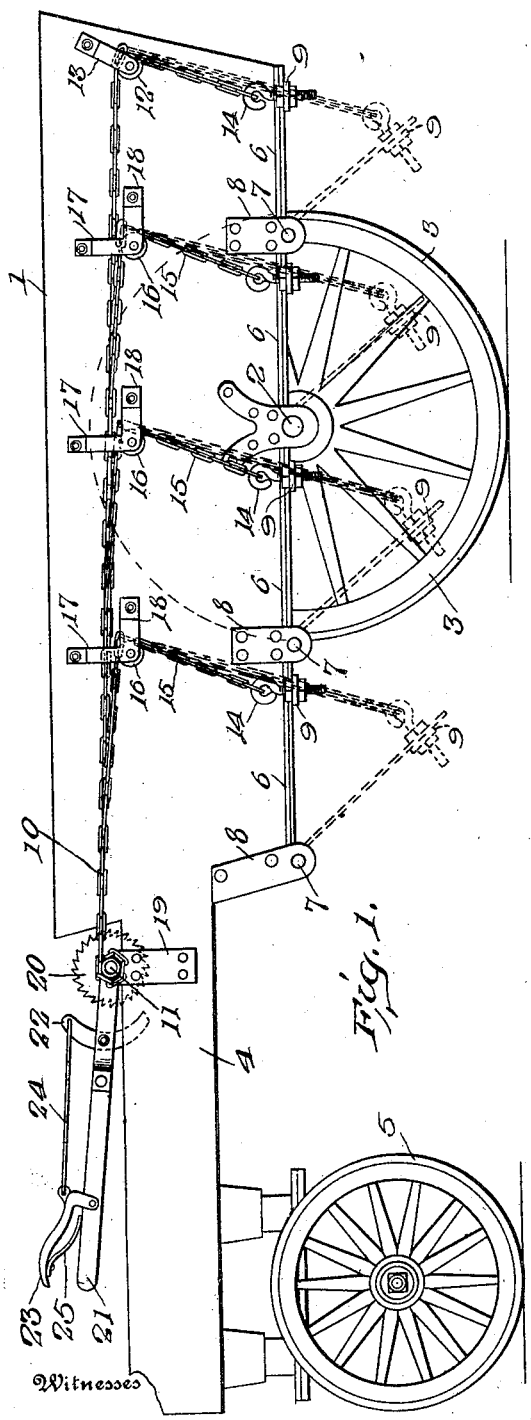
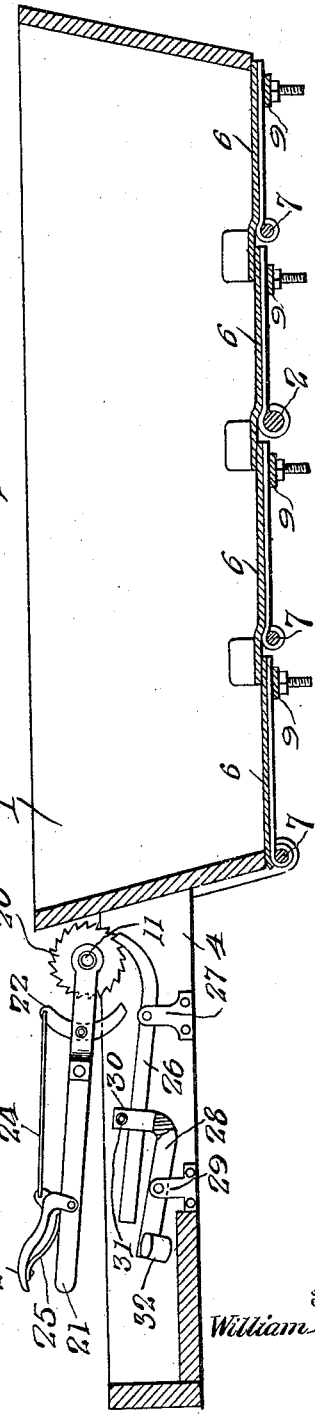
Witnesses
G. Howard Walmsley.
Edward L. Read
Inventor
William H. Moore,
By H. A. Toulmin
Attorney
THE NORRIS PETERS CO., WASHINGTON, D. C.

UNITED STATES PATENT OFFICE.

WILLIAM H. MOORE, OF SPRINGFIELD, OHIO.

DUMP-WAGON.

No. 914,157.     Specification of Letters Patent.     Patented March 2, 1909.

Application filed April 23, 1908. Serial No. 428,719.

*To all whom it may concern:*

Be it known that I, WILLIAM H. MOORE, a citizen of the United States, residing at Springfield, in the county of Clark and State of Ohio, have invented certain new and useful Improvements in Dump - Wagons, of which the following is a specification, reference being had therein to the accompanying drawings.
This invention relates to dump wagons, and the object of the same is to provide a low-down dump-wagon having a short coupling and so constructed as to discharge the material rearwardly therefrom: and further, to provide a wagon having these characteristics which will be simple in its construction and operation and which will be strong and durable, having no parts which can be easily broken or disarranged.
With these objects in view my invention consists in certain novel features of construction and in certain parts and combinations hereinafter to be described, and then more particularly pointed out in the claims.
In the accompanying drawings, Figure 1 is a side elevation of a dump wagon embodying my invention; and Fig. 2 is a longitudinal sectional view, taken vertically through a portion of such wagon.
In these drawings, I have illustrated the preferred form of my invention and have shown the same as comprising a body portion 1, preferably having its walls inclined inwardly and downwardly, as shown. This body portion is supported directly upon a transverse axis 2 having the ground wheels 3, thus supporting the body portion of the wagon close to the ground. The forward portion of the wagon is cut away, as shown at 4, and is supported by the front wheels 5 which are connected thereto in the usual manner.

The bottom of the body portion of the wagon is formed, preferably, of a plurality of sections 6 extending transversely to the length of the body portion and so mounted thereon that the rear edge of each of said sections can be moved toward and away from the body portion. Each section is provided with means for controlling the movement of the same and for supporting the section in a downwardly and rearwardly inclined position, thus causing the dirt or other material which is contained in the wagon to be discharged therefrom downwardly and rearwardly. This is preferably accomplished by pivotally mounting each section on an axis extending transversely to the length of the wagon and secured to the section near the forward edge thereof. In the present instance, each section 6 is mounted near its forward edge on a shaft 7 extending transversely to the body portion of the wagon and having its opposite ends mounted in downwardly extending brackets 8 secured to the opposite sides of said body portion. The forward portion of each section, which lies beyond the axis 7, is preferably bent upwardly a short distance, as shown, to enable the same to extend over the rear edge of the preceding section, thus making a tight bottom and preventing the escape of the material therefrom when the sections are in their closed position.

Each section is of a length equal to, or greater than, the inside width of the lower portion of the body and is provided on its opposite ends, and preferably near the forward edge thereof, with outwardly extending lugs 9 to each of which is secured the end of an operating chain, which is controlled from the driver's seat, for raising the section from its open to its closed position and for supporting the same in its closed position and in its open position. In the present instance, I have shown a main chain 10, connected at its forward end to a suitable winding drum 11 and extending rearwardly along the outside of the body portion of the wagon to a point above the rear edge of the rearmost section 6 where it passes over a suitable guide, such as a roller 12 mounted in a bracket 13 secured to the side of said body portion, thence downwardly and is secured to the section 6 by means of an open eye-bolt 14 secured in the lug 9 carried by said section. The main chain 10 is provided with a plurality of branches 15, these branches corresponding in number to the number of sections 6 of the bottom. Each branch is secured at its lower end to the lug 9 of its particular section by the eye-bolt 14 and thence extends upwardly over a guide 16 supported from the side of the body portion by brackets 17 and 18 arranged at an angle one to the other and adapted to hold said guide against movement in any direction. After passing around the rear side of this guide 16, the branch chain extends forwardly and is secured to the main chain 10 at a point some distance in front of the guide 16, which guide is preferably located immediately above the rear edge of the corresponding section 6 of the botton. I preferably provide a main chain, 10, with the several branch chains 15, on each side of the body portion in such a manner as to support each section at each end thereof, and further, these branch chains are so arranged and are so connected to the main chain that when the main chain is operated, all the branch chains will be simultaneously actuated and will serve to simultaneously move the several sections 6 comprising the bottom, and further, when the rearmost section 6, to which the main chain is directly connected, is in its closed position, all of the other sections will be in their closed positions respectively, and, when the main chain is released, all of the sections will open simultaneously and all will be supported in the same position, that is, inclined downwardly and rearwardly.

By mounting the axle 2 in vertical alinement with the transverse axis of one of the pivoted sections I am enabled to place that axle at a point near the middle of the body portion of the wagon, thus placing the support for the body portion in a position where it will be most effective and greatly shortening the coupling of the wagon. When placed in this position the axle does not interfere with the operation of dumping the wagon, and, in the preferred construction, I have shown this axle as forming the axis for the adjacent section 6, which section is pivotally mounted directly on that axle, as shown, thus entirely preventing any possible interference of the axle with the movement of the section.

The chain which operates the pivoted sections may be actuated and controlled in any suitable manner. In the present instance, I have shown the same as mounted upon the drum or shaft 11 which is journaled in brackets 19 mounted on the wagon near the front end of the body portion thereof and is provided at one end with a ratchet wheel 20 and has pivotally mounted thereon near said ratchet wheel an operating lever 21 having a pivoted pawl 22 adapted to engage the teeth of said ratchet wheel. This pivoted pawl is controlled by a suitable handle 23 which is operatively connected thereto by a link 24 and is held normally in its outermost position, with the pawl 22 out of engagement with the ratchet wheel 20, by means of a spring 25. A second pawl 26 is pivotally mounted in suitable brackets 27 carried by the forward portion of the wagon. This pawl is of considerable length and is pivotally supported at a point in the rear of its center. Thus, the weight of the forward end of the pawl serves to hold the opposite end thereof normally in engagement with the teeth of the ratchet wheel 20 and thereby prevent the rotation of that wheel in such a direction as to permit the sections 6 of the bottom to open. I prefer to provide this pawl 26 with suitable foot-operated means for releasing the same, which, in the present instance, comprises a lever 28 pivotally mounted on brackets 29 carried by the wagon at a point in front of the pivotal center of the pawl 26 and having its upturned rear end 30 bifurcated and extending on opposite sides of the forward portion of the pawl 26, which pawl is retained therein by means of a pin 31 extending through the arms of said bifurcated portion of the lever above the pawl. The lever 28 is provided at its forward end with a foot piece 32 by means of which the lever can be rocked about its pivotal center to raise the forward end of the pawl 26 and thus move the rear end of that pawl out of engagement with the teeth of the ratchet wheel 20, thereby releasing the drum 11 and chain 10, which is wound thereon, and permitting the sections 6 of the bottom of the wagon to move to an open position under the influence of their own weight and the weight of the load which they carry.

As stated, the chain 10 is stopped in such a position as to support the several sections in a downwardly and rearwardly inclined position. Consequently, it will be seen that the load will be discharged from said wagon in a rearward direction and that very little, if any, of the load will be deposited in front of the wagon wheels. Further, it will be seen that by mounting the wagon wheels at a considerable distance from the rear end of the wagon I have greatly shortened the coupling of the wagon, and, by mounting the body portion of the wagon directly upon the axle, I support the body portion close to the ground. And further, it will be apparent that the construction by means of which I accomplish these results is extremely simple and that the operation and controlling means is also of a very simple character and is positive in its operation.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a dump wagon, a body portion, an axle extending transversely thereto, a bottom for said body portion comprising a section journaled on said axle, and means for controlling the movement of said section.

2. In a dump wagon, an axle circular in cross section, a body portion supported directly upon said axle, a bottom for said body portion comprising a section journaled on said axle, and means for controlling the movement of said section.

3. In a dump wagon, a body portion, an axle extending transversely thereto, a bottom for said body portion comprising a plurality of transverse sections, a part of said sections being pivotally supported from said body portion, and one of said sections being journaled on said axle, and means for controlling the movement of said sections.

4. In a dump wagon, the combination, with front and rear axles, and ground wheels mounted on said axles, of a body portion having its rearward portion supported directly upon the rear axle and having its forward portion cut away to permit the front wheels to pass beneath the same, and a bottom for said body portion comprising a plurality of transverse sections, one of said sections being pivotally mounted on said rear axle and the remainder of said sections being pivotally supported on said body portion.

In testimony whereof, I affix my signature in presence of two witnesses.

WILLIAM H. MOORE.

Witnesses:
J. FRED ANDERSON,
EDWARD S. REED.